(12) United States Patent
Husemann et al.

(10) Patent No.: US 6,958,186 B2
(45) Date of Patent: Oct. 25, 2005

(54) DOUBLE SIDED ADHESIVE TAPE

(75) Inventors: Marc Husemann, Hamburg (DE); Stephen Zöllner, Hamburg (DE); Uwe Schümann, Pinneberg (DE)

(73) Assignee: tesa Aktiengesellschaft, Hamburg (DE)

( * ) Notice: Subject to any disclaimer, the term of this patent is extended or adjusted under 35 U.S.C. 154(b) by 16 days.

(21) Appl. No.: 10/197,767

(22) Filed: Jul. 18, 2002

(65) Prior Publication Data

US 2003/0113533 A1 Jun. 19, 2003

(30) Foreign Application Priority Data

Oct. 31, 2001 (DE) .......... 101 53 677

(51) Int. Cl.$^7$ .................. B32B 7/12
(52) U.S. Cl. ............... 428/346; 428/355 N
(58) Field of Search ............... 428/346, 349, 428/352, 354, 355 R, 355 N, 423.1, 480, 42.3, 40.1, 41.5, 420; 526/935

(56) References Cited

U.S. PATENT DOCUMENTS

| | | | |
|---|---|---|---|
| 3,326,741 A | 6/1967 | Olson .................. | 161/184 |
| 3,639,500 A | 2/1972 | Muny et al. ........... | 260/837 |
| 4,199,646 A | 4/1980 | Hori et al. ............ | 428/344 |
| 4,248,748 A | 2/1981 | McGrath et al. ....... | 260/27 |
| 4,404,246 A | 9/1983 | Charbonneau et al. .... | 428/212 |
| 4,404,345 A | 9/1983 | Janssen ............... | 526/206 |
| 4,452,955 A | 6/1984 | Boeder ............... | 525/518 |
| 4,545,843 A | 10/1985 | Bray .................. | 156/322 |
| 4,581,429 A | 4/1986 | Solomon et al. ........ | 526/220 |
| 4,880,683 A | * 11/1989 | Stow .................. | 428/200 |
| 5,229,207 A | 7/1993 | Paquette et al. ....... | 428/355 |
| 5,593,759 A | 1/1997 | Vargas et al. ......... | 428/200 |
| 5,767,210 A | 6/1998 | Lecomte et al. ........ | 526/166 |
| 5,789,487 A | 8/1998 | Matyjaszewski et al. ... | 525/301 |
| 5,804,672 A | 9/1998 | Bolte et al. .......... | 525/438 |
| 5,811,500 A | 9/1998 | Dubois et al. ......... | 526/145 |
| 5,854,364 A | 12/1998 | Senninger et al. ...... | 526/192 |
| 5,858,495 A | * 1/1999 | Eikmeier et al. ....... | 428/40.1 |
| 5,897,949 A | * 4/1999 | Luhmann et al. ....... | 428/317.3 |
| 5,919,871 A | 7/1999 | Nicol et al. .......... | 525/333.8 |
| 5,945,491 A | 8/1999 | Matyjaszewski et al. ... | 526/111 |
| 6,114,482 A | 9/2000 | Senninger et al. ...... | 526/172 |
| 6,124,032 A | 9/2000 | Bloch et al. .......... | 428/346 |

FOREIGN PATENT DOCUMENTS

| | | | |
|---|---|---|---|
| DE | 195 41 923 A1 | 5/1997 | .......... C09J/175/04 |
| DE | 196 05 535 A1 | 8/1997 | .......... C09J/7/02 |
| DE | 696 02 835 | 3/2000 | .......... C09J/151/05 |
| DE | 199 49 352 A1 | 4/2000 | .......... C07D/241/52 |
| EP | 0 735 052 A2 | 10/1996 | .......... C08F/2/38 |
| EP | 0 824 110 A1 | 2/1998 | .......... C08F/4/00 |
| EP | 0 824 111 A1 | 2/1998 | .......... C08F/4/00 |
| EP | 0 826 698 A1 | 3/1998 | .......... C08F/4/00 |
| EP | 0 850 957 A1 | 7/1998 | .......... C08F/4/00 |
| EP | 0 822 967 | 6/1999 | .......... C09J/151/06 |
| EP | 0 841 346 B1 | 9/1999 | .......... C08F/4/00 |
| GB | 2342649 | 4/2000 | .......... C07D/233/30 |
| WO | WO 96/24620) | 8/1996 | .......... C08F/4/00 |
| WO | WO 98/01478 | 1/1998 | .......... C08F/2/38 |
| WO | WO 98/13392 | 4/1998 | .......... C08F/4/00 |
| WO | WO 98/44008 | 10/1998 | .......... C08F/4/00 |

OTHER PUBLICATIONS

Abstract of English language counterpart of EP 0 826 698 a1.

* cited by examiner

*Primary Examiner*—Thao Tran
(74) *Attorney, Agent, or Firm*—Norris McLaughlin & Marcus PA

(57) ABSTRACT

An adhesive tape comprising at least a three-layer product structure having the following layers A, B, and C with the layer sequence ABC:

Layer A: heat activatable adhesive having a characteristic activation temperature $T_A$ of at least +30° C., Layer B: crosslinked polyurethane carrier material, Layer C: polyacrylate PSAs having a static glass transition temperature $T_{G,C}$ of not more than +15° C.

9 Claims, 1 Drawing Sheet

DOUBLE SIDED ADHESIVE TAPE

The invention relates to double sided adhesive tapes.

BACKGROUND OF THE INVENTION

For industrial pressure-sensitive adhesive tape applications it is very common to use double sided pressure sensitive adhesive (PSA) tapes in order to bond two materials to one another. For the wide variety of applications the requirements are in some cases highly specific, with the consequence that stringent requirements are imposed on the corresponding adhesive tapes. In the automobile segment, for example, the requirements very often include high temperature stability and a high level of resistance to solvents and fuels. These properties are met in a very good form by crosslinked acrylic pressure sensitive adhesives (acrylic PSAs).

Additionally, again in the industrial sector, a very wide variety of substrates may be bonded. In this case it may sometimes be of advantage to use heat activatable adhesives which soften above a certain temperature, flow very well onto the substrate, and then cool to give a firm bond.

U.S. Pat. No. 6,124,032, for example describes a heat activatable adhesive tape for sealing cartons. The requirements in this segment, however, are very low, since the forces which act on the adhesive tape by the carton are relatively low. This is manifested in the carrier material, which is composed of paper. The focus is therefore not on bond strength but rather on a production process for an expensive PSA tape.

U.S. Pat. No. 5,593,759 describes a double sided PSA tape which is composed of a carrier layer coated with two thin PSAs. The carrier layer is composed of a structural adhesive. On thermal activation, the PSA blends with the structural adhesive and also cures it. In this way, very firm bonds between two adherends are possible. Nevertheless, this PSA tape has an elementary disadvantage for many applications, namely the fact that the double sided PSA tape is tacky on both sides to start with. There exist a large number of applications in which it is advantageous if the PSA tape is nontacky, at least on one side, and hence possesses optimum repositionability. In U.S. Pat. No. 5,593,759 this advantage is absent.

U.S. Pat. No. 4,248,748 describes heat activatable polyacrylate PSAs with additions of resin. The additions of resin raise the glass transition temperature of the polyacrylate PSA and hence the tack at room temperature. The heat activatable PSAs are, however, used only for single sided PSA tapes (film bonding, etc.). Accordingly, the requirements concerning the bonding of adherends or the anchoring of heat activatable PSAs to the film are not high.

U.S. Pat. No. 4,199,646 describes heat activatable PSA tapes where the heat activatable PSA has a modulus of elasticity of from 10 to 300 kg/cm$^2$. The modulus at the activation temperature is therefore at the level of PSAs at room temperature. In this patent as well, in analogy to U.S. Pat. No. 4,248,748, the bond strength and the elasticity are controlled via the composition of the PSA. Moreover, only double sided heat activatable PSA tapes are described, which can be activated by heat only on both sides.

Accordingly there is a need for an adhesive tape which, by virtue of its construction and the adhesives used, is suitable for bonding different materials to one another in specific fields of application.

SUMMARY OF THE INVENTION

It has been found, surprisingly, that adhesive tapes with the following inventive structure meet the requirements outstanding. The invention accordingly provides an adhesive tape which on one side is heat activatable and on the other side is tacky even at room temperature, the two adhesives being connected by a carrier which owing to its variability is available even in very high layer thicknesses, by virtue of its elasticity is also able to increase the bond strength of the adhesives to a great extent, and for structural strength is attached chemically to the adhesives. The subclaims provide further advantageous embodiments of the invention. The invention additionally provides for the use of the adhesive tapes described.

DETAILED DESCRIPTION

In one aspect of the invention, there is provided an adhesive tape having an at least three-layer product structure composed of the following layers A, B, and C with the layer sequence ABC, where layer A is a heat activatable adhesive having a characteristic activation temperature $T_A$ of at least +30° C., layer B is composed of a crosslinked polyurethane carrier material, and layer C is a pressure sensitive adhesive based on polyacrylates and/or polymethacrylates and has a static glass transition temperature of not more than +15° C.

In one very preferred embodiment of the inventive adhesive tape at least one of the layers A or C is attached by chemical bonding to the polyurethane carrier layer B. Very preferably, this is true of both layers A and C.

Layer A

Layer A comprises a heat activatable adhesive which becomes tacky on exposure to temperature and optional pressure and after bonding and cooling solidifies to develop a high bond strength. Depending on the temperature at which the heat activatable adhesives are to develop their adhesive properties in an application, polymers of different composition and chemical nature (degree of crystallinity or of amorphous character) can be used; these polymers have different static glass transition temperatures $T_{G,A}$ and/or melting points $T_{S,A}$.

Depending on their chemical structure or nature, heat activation may cause the heat activatable adhesives to develop normal or pressure sensitive tack, the term "tacky" as used herein being intended to embrace both qualities.

For the activation of the adhesive behavior in the case of heat activatable adhesives, both the glass transition temperature $T_{G,A}$, especially for amorphous systems, and the melting temperature $T_{S,A}$, especially for crystalline and/or partly crystalline systems, may be of importance.

Consequently, for the purposes of this invention, the characteristic activation temperature $T_A$ is defined for amorphous systems as their glass transition temperature $T_{G,A}$ and for crystalline and partly crystalline systems as their melting temperature $T_{S,A}$. The term "activation temperature $T_A$" should be understood in this context below.

The heat activatable adhesives may have different polymer structures. In one preferred version heat activatable adhesives, especially pressure sensitive adhesives, based on poly(meth)acrylate are used. It is very preferable to use poly(meth)acrylate PSAs composed of polymers of at least the following monomers:

a1) from 70 to 100% by weight of acrylates and/or methacrylates and/or their free acids with the following formula

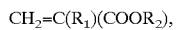

where $R_1$ is H or $CH_3$ and $R_2$ is H or alkyl chains having from 1 to 30 carbon atoms.

For the preparation of the polymers, moreover, the following monomers are optionally added:

a2) up to 30% by weight of olefinically unsaturated monomers containing functional groups.

In one very preferred version the monomers a1) used are acrylic monomers comprising acrylates and methacrylates having alkyl groups composed of from 1 to 14 carbon atoms. Specific examples, without wishing to be restricted by this list, are methyl acrylate, methyl methacrylate, ethyl acrylate, ethyl methacrylate, propyl acrylate, propyl methacrylate, n-butyl acrylate, n-butyl methacrylate, n-pentyl acrylate, n-hexyl acrylate, n-hexyl methacrylate, n-heptyl acrylate, n-octyl acrylate, n-nonyl acrylate, lauryl acrylate, stearyl acrylate, stearyl methacrylate, behenyl acrylate, and their branched isomers, such as 2-ethylhexyl acrylate, for example. Further classes of compound which can be used and which may likewise be added in small amounts under a1) are cyclohexyl methacrylates, isobornyl acrylates, and isobornyl methacrylates.

In one advantageous variant, for a2) acrylic monomers of the following general formula are used

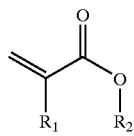

where $R_1$ is H and/or $CH_3$ and the radical —$OR_2$ denotes or comprises a functional group which supports subsequent UV crosslinking of the pressure sensitive adhesive, possessing, for example, in one particularly preferred version an H-donor effect.

Particularly preferred examples of component a2) are hydroxyethyl acrylate, hydroxypropyl acrylate, hydroxyethyl methacrylate, hydroxypropyl methacrylate, allyl alcohol, maleic anhydride, itaconic anhydride, itaconic acid, acrylamide and glyceridyl methacrylate, benzyl acrylate, benzyl methacrylate, phenyl acrylate, phenyl methacrylate, t-butylphenyl acrylate, t-butylphenyl methacrylate, phenoxyethyl acrylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate, cyanoethyl methacrylate, cyanoethyl acrylate, glyceryl methacrylate, 6-hydroxyhexyl methacrylate, N-tert-butylacrylamide, N-methylolmethacrylamide, N-(butoxymethyl)methacrylamide, N-methylolacrylamide, N-(ethoxymethyl)acrylamide, N-isopropylacrylamide, vinyl acetic acid, tetrahydrofurfuryl acrylate, β-acryloyloxypropionic acid, trichloracrylic acid, fumaric acid, crotonic acid, aconitic acid, dimethylacrylic acid, this list not being conclusive.

In a further preferred version for component a2) aromatic vinyl compounds are used in which the aromatic nuclei are composed preferably of $C_4$ to $C_{18}$, units, which may also contain heteroatoms. Particularly preferred examples are styrene, 4-vinylpyridine, N-vinylphthalimide, methylstyrene, 3,4-dimethoxystyrene, 4-vinylbenzoic acid, this list not being conclusive.

For the polymerization the monomers are chosen such that the resulting polymers can be used as heat activatable adhesives, especially such that the resulting polymers possess pressure sensitive adhesive properties in accordance with "Handbook of Pressure Sensitive Adhesive Technology" by Donatas Satas (van Nostrand, N.Y., 1989). For these applications the characteristic activation temperature $T_A$ of the resulting polymer is advantageously above 30° C. For heat activatable polyacrylate PSAs and polymethacrylate PSAs the characteristic activation energy $T_A$ is defined as their glass transition temperature $T_{G,A}$.

In order to obtain a polymer glass transition temperature $T_{G,A} \geq 30°$ C., in accordance with the above remarks, the monomers are very preferably selected in such a way, and the quantitative composition of the monomer mixture advantageously chosen in such a way, that in accordance with equation (G1) (in analogy to the Fox equation, cf. T. G. Fox, Bull. Am. Phys. Soc. 1 (1956) 123), the polymer has the desired $T_{G,A}$.

$$\frac{1}{T_{G,A}} = \sum_n \frac{w_n}{T_{G,n}} \quad (G1)$$

In this equation, n represents the serial number of the monomers used, $w_n$ denotes the mass fraction of the respective monomer n (in % by weight), and $T_{G,n}$ denotes the respective glass transition temperature of the homopolymer of the respective monomer n, in K.

The various preparation processes (polymerization processes) for polyacrylate PSAs of this kind are described later on below.

For the anchoring of these heat activatable poly(meth)acrylates it may be of advantage if the polymer is corona treated prior to coating onto the polyacrylate carrier layer B. Moreover, for the process and for the anchoring of the layer A to the layer B it may be of advantage if the heat activatable poly(meth)acrylate contains hydroxyl or carboxylic acid functions which are reacted with the isocyanates of the PU layer B and which therefore likewise significantly improve the anchoring. It may therefore be appropriate to choose the comonomers for layer A such that, for example, hydroxyl- or carboxyl-containing comonomers are used.

In another preferred embodiment of the adhesive tape of the invention polyolefins are used, especially poly-α-olefins, for the heat activatable adhesive of layer A. These polyurethanes likewise have a characteristic activation temperature $T_A$ of more than 30° C. and advantageously likewise solidify in the course of cooling after adhesive bonding. For partly crystalline polyolefins (all of the polyolefin compounds set out in the examples fall into this group) the characteristic activation energy $T_A$ is defined as their melting point $T_{S,A}$. In one preferred embodiment the polyolefin activatable adhesives have characteristic activation temperatures $T_A$ of from +35° C. to 180° C. The bond strength of these polymers can be increased by including specific additives. For example, polyimine or polyvinyl acetate copolymers can be used as bond strength promoter additives.

Here again, in order to achieve the desired characteristic activation energy $T_A$, the monomers used and their amounts are again preferably chosen so that, using equation (G1), the desired temperature results if $T_{G,A}$ in the equation is replaced by $T_A$ and $T_{G,n}$ by $T_{A,n}$. $T_{A,n}$ is then the respective characteristic activation temperature of the homopolymer of the respective monomer n in K as defined above; in the case of partly crystalline homopolymers, this can be equated with the respective melting temperature $T_{S,n}$.

For practical application, the characteristic activation energy $T_A$ of the heat activatable layer A is restricted further. If an adhesive tape is chosen in which the characteristic activation energy $T_A$ of the heat activatable adhesive of layer A is too low, then there is a risk that the adhesive tape will begin to melt at elevated temperatures during dispatch or during transit, and the adhesive tape will no longer be able to be unwound.

In order to find an adhesive with optimum activation energy for a field of application, the molecular weight and the comonomer composition are varied. In order to set a low characteristic activation energy $T_A$, polymers having a medium or low molecular weight are used. It is also possible to mix polymers of low and high molecular mass with one another. In particularly preferred embodiments polyethenes, polypropenes, polybutenes, polyhexenes or copolymers of polyethene, polypropene, polybutene or polyhexene are used.

Polyethylene and polyethylene copolymers can be coated, for example, in the form of aqueous dispersions. The mixture used is again dependent on the desired characteristic activation energy $T_A$ of layer A.

Under the trade name Vestoplast®, different heat activatable poly-α-olefins are available commercially from Degussa. Varieties high in propene are offered under the designations Vestoplast® 703, 704, 708, 750, 751, 792, 828, 888 or 891. These possess melting points $T_{S,A}$ of from 99 to 162° C. Additionally, types high in butene are available commercially under the designations Vestoplast® 308, 408, 508, 520 and 608. These possess melting points $T_{S,A}$ of from 84 to 157° C. In all these cases the melting point $T_{S,A}$ can be equated with the characteristic activation energy $T_A$.

In one preferred process the dispersion is first coated onto a relief paper, dried, and then transferred to layer B. In order to improve anchoring it is advisable to subject the heat activatable polymer to corona treatment.

Further examples of heat activatable adhesives are described in the patents U.S. Pat. Nos. 3,326,741, 3,639,500, 4,404,246, 4,452,955, 4,404,345, 4,545,843, 4,880,683 and 5,593,759. These patents likewise refer to other temperature activatable adhesives.

As further possible adhesives or PSAs for layer A it is possible, in addition to the classes of compound mentioned above, to make further use, with advantage, of polyesters, EVAs and/or polyamides. Examples of particularly suitable polyamides are the Witco products sold under the name Euremelt®. Euremelt® products are polycondensates of dimerized fatty acids and diamines.

Layer B

For preparing the polyurethane layer both aliphatic and aromatic isocyanates can be used. With particular preference the polyurethane carrier layer B is based on a polymer of polyfunctional isocyanates.

Suitable examples include isophorone diisocyanate, hexamethylene diisocyanate, dicyclohexylmethane 4,4'-diisocyanate, tolylene diisocyanate, diphenylmethane 4,4'-diisocyanate or m-tetramethylxylene diisocyanate, mixtures of said isocyanates or isocyanates derived chemically from them, examples being dimerized, trimerized or polymerized types containing, for example, urea, uretdione or isocyanurate groups. As the isocyanate component it is also possible to use prepolymers; that is, reaction products of isocyanate and polyol prepared beforehand in an NCO/OH ratio of more than one.

In another preferred embodiment, the polyol component used comprises polypropylene glycols, polyethylene glycols, hydrogenated hydroxyl-functionalized polyisoprenes, hydroxyl-functionalized polyisobutylenes or hydroxyl-functionalized polyolefins. Likewise suitable for use are hydroxyl-functionalized polybutadienes and other, hydrogenated and non-hydrogenated hydroxyl-functionalized hydrocarbons. Polytetramethylene glycol ethers (polytetrahydrofurans) are likewise suitable. Further compounds which can be used with advantage are polyester polyols and also mixtures of the aforementioned polyol components. As the polyol component it is likewise possible to use reaction products of isocyanate and polyol prepared beforehand in an NCO/OH ratio of less than 1. Known chain extenders, short-chain crosslinkers or terminators may likewise be used in forming the polyurethane layer.

In order to obtain an appropriate coating viscosity, the polyurethane components may also be diluted with solvents.

Besides the isocyanate components listed and the polyol components which react with them, other starting materials may also be used in forming the polyurethane without departing the scope of the invention. In particular, amine-functionalized components, such as polyether-amines or amino-containing chain extenders or crosslinkers, may also be employed in preparing the polyurethane-based layer B.

In order to accelerate the reaction between the isocyanate-component and the isocyanate-reactive component, any catalysts $know_n$ to the skilled worker, such as tertiary amines, organobismuth compounds or organotin compounds, for example, may be used.

Polyurethanes as described above are prior art in terms of their preparation and are described, for example, in "Ullmann's Encyclopedia of Industrial Chemistry, Vol. A21: Polyurethanes".

In one possible embodiment the polyurethane layer comprises further formulating ingredients, such as fillers, pigments, rheological additives, adhesion promoter additives, plasticizers, resins, elastomers, aging inhibitors (antioxidants), light stabilizers, UV absorbers and other auxiliaries and additives, such as dryers (for example, molecular sieve zeolites, calcium oxide), flow control and leveling agents, wetting agents (surfactants) or catalysts, for example.

Fillers which can be used include all finely ground solid additives such as, for example, chalk, magnesium carbonate, zinc carbonate, kaolin, barium sulfate, titanium dioxide or calcium oxide. Further examples are talc, mica, silica, silicates or zinc oxide. Mixtures of said substances may also be used.

The pigments used may be organic or inorganic in nature. All kinds of organic or inorganic color pigments are suitable, examples being white pigments such as titanium dioxide for the purpose of improving the light stability and UV stability, and also metal pigments.

Examples of rheological additives are pyrogenic silicas, phyllosilicates (bentonites), high molecular mass polyamide powders or castor oil derivative powders.

Adhesion promoter additives may comprise, for example, substances from the groups of the polyamides, epoxides or silanes.

Examples of plasticizers are phthalates, trimellitates, phosphates, esters of adipic acid, and other acyclic dicarboxylic esters, fatty acid esters, hydroxycarboxylic esters, alkylsulfonic esters of phenol, aliphatic, cycloaliphatic, and aromatic mineral oils, hydrocarbons, liquid or semisolid rubbers (for example, nitrile rubbers or polyisoprene rubbers), liquid or semisolid polymers of butene and/or isobutene, acrylates, polyvinyl ethers, liquid resins and plasticizer resins based on the raw materials which also constitute the basis of tackifier resins, wool wax and other waxes, silicones, and also polymer plasticizers such as polyesters or polyurethanes.

Suitable resins include all natural and synthetic resins, such as rosin derivatives, (for example, derivatives formed by disproportionation, hydrogenation or esterification), coumarone-indene resins and polyterpene resins, aliphatic or aromatic hydrocarbon resins (C-5, C-9, (C-5)$_2$ resins), mixed C-5/C-9 resins, hydrogenated and partly hydrogenated derivatives of the abovementioned types, resins of styrene or α-methylstyrene, and also terpene-phenolic resins and others as listed in Ullmanns Enzyklopädie der technischen Chemie, volume 12, pp. 525–555 (4th ed.), Weinheim.

Suitable elastomers are, for example, EPDM rubber or EPM rubber, polyisobutylene, butyl rubber, ethylene-vinyl acetate, hydrogenated block copolymers of dienes (for example, by hydrogenation of SBR, cSBR, BAN, NBR, SBS, SIS or IR; such polymers are known, for example, as SEPS and SEBS) or acrylic copolymers such as ACM.

The formulation of the polyurethanes with further ingredients, such as fillers and plasticizers, for example, is likewise state of the art and is employed in particular in the production of sealants (cf. "Ullmann's Encyclopedia of Industrial Chemistry, Vol. A 23: Sealing Materials").

In another preferred embodiment the polyurethane is formed at an NCO/OH ratio of from 0.6 to 1.4.

The functionalities of the components that are reactive with one another must be selected such that at least one of the two components has a functionality of more than two, so that crosslinking can take place.

For the purpose of producing a foam, an arbitrary gas, preferably nitrogen, air, carbon dioxide or a noble gas, is used.

The adhesives may be applied directly, by the indirect transfer method or by coextrusion with the polyurethane carrier from solution, dispersion or the melt. One particularly preferred form of application is the "inverse" application method. With this method one of the two adhesives from layer A or C, applied to release paper or release film, dried where appropriate and crosslinked, is introduced and is coated in the desired thickness with the as yet uncured, pastelike or liquid polyurethane composition with the assistance of the two-component mixing technique.

For this purpose, substantially the polyol component is introduced in a vessel 1 and substantially the isocyanate component is introduced in a vessel 2, the further formulating ingredients having, where appropriate, already being admixed with these components in a customary mixing method. The gas used for producing a foam may also have already been dispersed into the components.

In a mixer or in a multicomponent mixing and metering unit, the polyol component and the isocyanate component and, where appropriate, the gas, if it has not already been dispersed into one of the components beforehand, are mixed. For this purpose the gas is metered under pressure into the mixing head constructed to this end. Metering is regulated automatically by way of a flow meter.

The polyurethane composition thus mixed, foamed or unfoamed, is applied to the adhesive, which is preferably moving at a constant speed. The adhesive coated with the polyurethane composition is passed through a heat tunnel in which the polyurethane composition is cured. The application rate of the polyurethane composition is arbitrary; the application rates set are preferably between 100 and 1 000 g/m$^2$, with particular preference between 400 and 800 g/m$^2$. In the case of foaming, the foam density set is in the range between 50 and 1 600 kg/m$^3$, preferably between 200 and 900 kg/m$^3$.

Still before curing or crosslinking of the polyurethane composition, the second adhesive of layer A or layer C, which is likewise already present on release paper or release film, having already been applied, dried where appropriate, and crosslinked, is laminated to the applied polyurethane composition. This is followed by the curing or crosslinking of the polyurethane composition in a pass through the drying tunnel at a temperature between room temperature and 120° C., depending on the chosen polyurethane formulation and on the amount of catalyst.

Finally, the adhesive tape thus produced is wound up in a winding station, in the course of which at least one of the release papers or release films can be removed.

The process described makes it possible to work solventlessly and to produce foamed or unfoamed polyurethane backings in situ.

In order to enhance the anchoring of the polyurethane composition on the adhesive films, all known methods of surface pretreatment can be used, such as corona pretreatment, flame treatment, gas phase treatment (for example, fluorination), for example. Similarly, all known methods of priming can be used, the primer coats being applied to the adhesive films either from solution or dispersion or else in an extrusion or coextrusion process.

Layer C

As layer C it is greatly preferred to use polyacrylate PSAs composed of polymers of at least the following monomers c1) from 79 to 100% by weight of acrylates and/or methacrylates and/or their free acids with the following formula

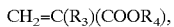
$CH_2=C(R_3)(COOR_4)$, where $R_3$ is H or $CH_3$ and $R_4$ is H or alkyl chains having from 1 to 30 carbon atoms.

Here again, a further component which may be added to the parent monomer mixture comprises:

c2) up to 30% by weight of olefinically unsaturated monomers containing functional groups.

In one very preferred version the monomers c1) used are acrylic monomers comprising acrylates and methacrylates having alkyl groups composed of from 4 to 14 carbon atoms, preferably from 4 to 9 carbon atoms. Specific examples, without wishing to be restricted by this list, are n-butyl acrylate, n-pentyl acrylate, n-hexyl acrylate, n-heptyl acrylate, n-octyl acrylate, n-nonyl acrylate, lauryl acrylate, stearyl acrylate, behenyl acrylate, and their branched isomers, such as 2-ethylhexyl acrylate, for example. Further classes of compound which can be used and which may likewise be added in small amounts under c1) are methyl methacrylates, cyclohexyl methacrylates, isobornyl acrylates, and isobornyl methacrylates.

In one very preferred version, monomers used for the monomers c2) include vinyl esters, vinyl ethers, vinyl halides, vinylidene halides, vinyl compounds with aromatic cycles and heterocycles in the α position. Here again, mention may be made nonlimitingly of some examples: vinyl acetate, vinyl formamide, vinylpyridine, ethyl vinyl ether, vinyl chloride, vinylidene chloride and acrylonitrile. In a further very preferred version for the monomers c2) monomers with the following functional groups are used: hydroxyl, carboxyl, epoxy, acid amide, isocyanato or amino groups.

In one advantageous variant, for c2) acrylic monomers of the following general formula are used

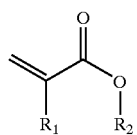

where $R_1$ is H or $CH_3$ and the radical —$OR_2$ denotes or comprises a functional group which supports subsequent UV crosslinking of the pressure sensitive adhesive, possessing, for example, in one particularly preferred version an H-donor effect.

Particularly preferred examples of component c2) are hydroxyethyl acrylate, hydroxypropyl acrylate, hydroxyethyl methacrylate, hydroxypropyl methacrylate, allyl alcohol, maleic anhydride, itaconic anhydride, itaconic acid, acrylamide and glyceridyl methacrylate, benzyl acrylate, benzyl methacrylate, phenyl acrylate, phenyl methacrylate, t-butylphenyl acrylate, t-butylphenyl methacrylate, phenoxyethyl acrylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate, cyanoethyl methacrylate, cyanoethyl acrylate, glyceryl methacrylate, 6-hydroxyhexyl methacrylate, N-tert-butylacrylamide, N-methylolmethacrylamide, N-(butoxymethyl)methacrylamide, N-methylolacrylamide, N-(ethoxymethyl)acrylamide, N-isopropylacrylamide, vinyl acetic acid, tetrahydrofurfuryl acrylate, β-acryloyloxypropionic acid, trichloroacrylic acid, fumaric acid, crotonic acid, aconitic acid, dimethylacrylic acid, this list not being conclusive.

In a further preferred version for component c2) aromatic vinyl compounds are used in which the aromatic nuclei are composed preferably of $C_4$ to $C_{18}$ units, which may also contain heteroatoms. Particularly preferred examples are styrene, 4-vinylpyridine, N-vinylphthalimide, methylstyrene, 3,4-dimethoxystyrene, 4-vinylbenzoic acid, this list not being conclusive For the polymerization the monomers are again chosen such that the resulting polymers can be used as industrial adhesives, especially such that the resulting polymers possess pressure sensitive adhesive properties in accordance with the "Handbook of Pressure Sensitive Adhesive Technology" by Donatas Satas (van Nostrand, N.Y., 1989). Here also, the desired glass transition temperature can be controlled by applying equation (G1) to the composition of the monomer mixture on which the polymerization is based. For the pressure sensitive adhesive of layer C the static glass transition temperature $T_{G,C}$ of the resulting polymer is advantageously below 15° C.

In order to prepare the polyacrylate PSAs for the layers A (when based on polyacrylates) and/or C it is advantageous to carry out conventional radical polymerizations or controlled radical polymerizations. For the polymerizations proceeding by a radical mechanism it is preferred to use initiator systems which additionally comprise further radical initiators for the polymerization, especially thermally decomposing, radical-forming azo or peroxo initiators. In principle, however, any customary initiators that are familiar to the skilled worker for acrylates are suitable. The production of C-centered radicals is described in Houben Weyl, Methoden der Organischen Chemie, Vol. E 19a, pp. 60–147. These methods are employed preferentially in analogy.

Examples of radical sources are peroxides, hydroperoxides, and azo compounds; some nonexclusive examples of typical radical initiators that may be mentioned here include potassium peroxodisulfate, dibenzoyl peroxide, cumene hydroperoxide, cyclohexanone peroxide, di-t-butyl peroxide, azodiisobutyronitrile, cyclohexylsulfonyl acetyl peroxide, diisopropyl percarbonate, t-butyl peroctoate, and benzpinacol. In one very preferred version 1,1'-azobis (cyclohexanecarbonitrile) (Vazo 88® from DuPont) is used as radical initiator.

The average molecular weights $M_n$ of the pressure sensitive adhesives formed in the course of the radical polymerization are very preferably chosen such as to be situated within a range from 20 000 to 2 000 000 g/mol; specifically for further use as hotmelt pressure sensitive adhesives, PSAs having average molecular weights $M_n$ of from 100 000 to 500 000 g/mol are prepared. The number average molecular weight $M_n$ is determined by size exclusion chromatography (SEC) or matrix-assisted laser desorption/ionization mass spectrometry (MALDI-MS).

The polymerization may be carried out in bulk, in the presence of one or more organic solvents, in the presence of water, or in mixtures of organic solvents and water. The aim is to minimize the amount of solvent used. Suitable organic solvents are pure alkanes (e.g., hexane, heptane, octane, isooctane), aromatic hydrocarbons (e.g., benzene, toluene, xylene), esters (e.g., ethyl, propyl, butyl or hexyl acetate), halogenated hydrocarbons (e.g., chlorobenzene), alkanols (e.g., methanol, ethanol, ethylene glycol, ethylene glycol monomethyl ether), and ethers (e.g., diethyl ether, dibutyl ether) or mixtures thereof. A water-miscible or hydrophilic cosolvent may be added to the aqueous polymerization reactions in order to ensure that in the course of monomer conversion the reaction mixture is in the form of a homogeneous phase. Cosolvents which can be used with advantage for the present invention are chosen from the following group, consisting of aliphatic alcohols, glycols, ethers, glycol ethers, pyrrolidines, N-alkylpyrrolidines, N-alkylpyrrolidones, polyethylene glycols, polypropylene glycols, amides, carboxylic acids and salts thereof, esters, organic sulfides, sulfoxides, sulfones, alcohol derivatives, hydroxy ether derivatives, amino alcohols, ketones, and the like, and also derivatives and mixtures thereof.

The polymerization time is between 4 and 72 hours depending on conversion and temperature. The higher the reaction temperature can be chosen, i.e., the higher the thermal stability of the reaction mixture, the lower the reaction time.

For the initiators which undergo thermal decomposition, the introduction of heat is essential to initiate the polymerization. For the thermally decomposing initiators the polymerization can be initiated by heating at from 50 to 160° C., depending on initiator type.

Another advantageous preparation process for the polyacrylate PSAs is anionic polymerization. In this case it is preferred to use inert solvents as the reaction medium, such as aliphatic and cycloaliphatic hydrocarbons, for example, or else aromatic hydrocarbons.

In this case the living polymer is generally represented by the structure $P_L(M)$-Me, in which Me is a metal from Group I of the Periodic Table, such as lithium, sodium or potassium, and $P_L(M)$ is a growing polymer block of the monomers M. The molar mass of the polymer to be prepared is determined by the ratio of initiator concentration to monomer concentration. Examples of suitable polymerization initiators include n-propyllithium, n-butyllithium, sec-butyllithium, 2-naphthyllithium, cyclohexyllithium or octyllithium, with this listing making no claim to completeness. Furthermore, initiators based on samarium complexes are known for the polymerization of acrylates (Macromolecules, 1995, 28, 7886) and can be used here.

Moreover, it is also possible to use difunctional initiators, such as 1,1,4,4-tetraphenyl-1,4-dilithiobutane or 1,1,4,4-tetraphenyl-1,4-dilithioisobutane. Coinitiators may likewise be used. Suitable coinitiators include lithium halides, alkali metal alkoxides or alkylaluminum compounds. In one very preferred version the ligands and coinitiators are chosen such that acrylic monomers, such as n-butyl acrylate and 2-ethylhexyl acrylate, for example, can be polymerized directly and need not be generated in the polymer by a transesterification with the corresponding alcohol.

In order to prepare polyacrylate PSAs having a narrow molecular weight distribution, the following controlled radical polymerization methods are also suitable. For the polymerization it is then preferred to use a control reagent of the formula (I) or (II):

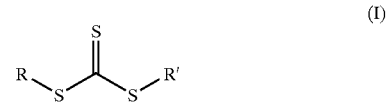

(I)

(II)

in which
R and R' independently of one another are chosen from the following groups:
branched and unbranched $C_1$ to $C_{18}$ alkyl radicals; $C_3$ to $C_{18}$ alkenyl radicals; $C_3$ to $C_{18}$ alkynyl radicals;
$C_1$ to $C_{18}$ alkoxy radicals;
$C_3$ to $C_{18}$ alkynyl radicals; $C_3$ to $C_{18}$ alkenyl radicals; $C_1$ to $C_{18}$ alkyl radicals substituted by at least one OH group or a halogen atom or a silyl ether;

$C_2$ to $C_{18}$ heteroalkyl radicals having at least one oxygen atom and/or one NR* group in the carbon chain, R* representing any organic radical;

$C_3$ to $C_{18}$ alkynyl radicals; $C_3$ to $C_{18}$ alkenyl radicals; $C_1$ to $C_{18}$ alkyl radicals substituted by at least one ester group, amine group, carbonate group, cyano, isocyanato and/or epoxide group and/or by sulfur;

$C_3$ to $C_{12}$ cycloalkyl radicals $C_6$ to $C_{18}$ aryl or benzyl radicals hydrogen.

Control reagents of type (I) and (II) are chosen in one preferred procedure from further-restricted groups of compounds, which are described below.

Halogens therein are preferably F, Cl, Br or I, more preferably Cl and Br. As alkyl, alkenyl, and alkynyl radicals in the various substituents, both linear and branched chains are outstandingly suitable.

Examples of alkyl radicals containing from 1 to 18 carbon atoms are methyl, ethyl, propyl, isopropyl, butyl, isobutyl, t-butyl, pentyl, 2-pentyl, hexyl, heptyl, octyl, 2-ethylhexyl, t-octyl, nonyl, decyl, undecyl, tridecyl, tetradecyl, hexadecyl and octadecyl radicals.

Examples of alkenyl radicals having from 3 to 18 carbon atoms are propenyl, 2-butenyl 3-butenyl, isobutenyl, n-2,4-pentadienyl, 3-methyl-2-butenyl, n-2-octenyl, n-2-dodecenyl, isododecenyl and oleyl radicals.

Examples of alkynyl radicals having from 3 to 18 carbon atoms are propynyl, 2-butynyl, 3-butynyl, n-2-octynyl and n-2-octadecynyl radicals.

Examples of hydroxy-substituted alkyl radicals are hydroxypropyl, hydroxybutyl and hydroxyhexyl radicals.

Examples of halogen-substituted alkyl radicals are dichlorobutyl, monobromobutyl and trichlorohexyl radicals.

A suitable $C_2$–$C_{18}$ hetero alkyl radical having at least one oxygen atom in the carbon chain is, for example, —$CH_2$—$CH_2$—O—$CH_2$—$CH_3$.

Examples of $C_3$–$C_{12}$ cycloalkyl radicals include cyclopropyl, cyclopentyl, cyclohexyl or trimethylcyclohexyl radicals.

Examples of $C_6$–$C_{18}$ aryl radicals include phenyl, naphthyl, benzyl, 4-tert-butylbenzyl or further substituted phenyl radicals, such as ethylbenzene, toluene, xylene, mesitylene, isopropylbenzene, dichlorobenzene or bromotoluene radicals.

The above listings serve only as examples of the respective groups of compounds, and make no claim to completeness.

Moreover, compounds of types (III) and/or (IV) may also be used as control reagents,

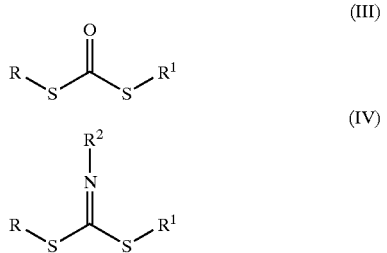

(III)

(IV)

where R and $R^1$ are as defined above and $R^2$ may be chosen independently of R and $R^1$ but from the same group.

In the case of the conventional RAFT process, polymerization is normally carried out only to low conversions (WO 98/01478 A1) in order to obtain very narrow molecular weight distributions. As a result of the low conversions, however, these polymers cannot be used as PSAs and in particular not as hotmelt PSAs, since the high fraction of residual monomers adversely affects the technical adhesive properties; the residual monomers would contaminate the solvent recyclate in the concentration process and the corresponding self-adhesive tapes would exhibit very high outgassing behavior. In order to circumvent these drawbacks of low conversions, in one particularly preferred version the polymerization for preparing the polyacrylate PSAs utilized in accordance with the invention is initiated a number of times.

As a further controlled radical polymerization method for preparing the acrylic PSAs used in accordance with the invention it is possible to carry out nitroxide-controlled polymerizations. In an advantageous procedure, radical stabilization is effected using nitroxides of type (Va) or (Vb):

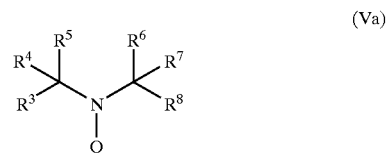

(Va)

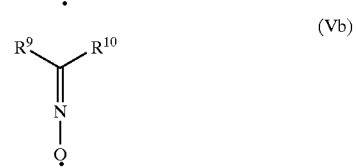

(Vb)

where $R^3$, $R^4$, $R^5$, $R^6$, $R^7$, $R^8$, $R^9$, and $R^{10}$ are chosen independently of one another and denote the following compounds or atoms:

i) halides, such as chlorine, bromine or iodine, ii) linear, branched, cyclic, and heterocyclic hydrocarbons having from 1 to 20 carbon atoms, which may be saturated, unsaturated or aromatic, iii) esters —$COOR^{11}$, alkoxides —$OR^{12}$ and/or phosphonates —$PO(OR^{13})_2$, where $R^{11}$, $R^{12}$, and $R^{13}$ stand for radicals from group ii).

Compounds of structure (Va) or (Vb) may also be attached to polymer chains of any kind (primarily in the sense that at least one of the abovementioned radicals constitutes a polymer chain of this kind) and may therefore be used to construct the block copolymers, as macro radicals or macro regulators.

With more preference, controlled regulators which can be chosen from the following list are used for the polymerization:

2,2,5,5-tetramethyl-1-pyrrolidinyloxyl (PROXYL), 3-carbamoyl-PROXYL, 2,2-dimethyl-4,5-cyclohexyl-PROXYL, 3-oxo-PROXYL, 3-hydroxylimine-PROXYL, 3-aminomethyl-PROXYL, 3-methoxy-PROXYL, 3-t-butyl-PROXYL, 3,4-di-t-butyl-PROXYL 2,2,6,6-tetramethyl-1-piperidinyloxyl (TEMPO), 4-benzoyloxy-TEMPO, 4-methoxy-TEMPO, 4-chloro-TEMPO, 4-hydroxy-TEMPO, 4-oxo-TEMPO, 4-amino-TEMPO, 2,2,6,6,-tetraethyl-1-piperidinyloxyl, 2,2,6-trimethyl-6-ethyl-1-piperidinyloxyl N-tert-butyl 1-phenyl-2-methylpropyl nitroxide N-tert-butyl 1-(2-naphthyl)-2-methylpropyl nitroxide N-tert-butyl 1-diethylphosphono-2,2-dimethylpropyl nitroxide N-tert-butyl 1-dibenzylphosphono-2,2-dimethylpropyl nitroxide N-(1-phenyl-2-methylpropyl) 1-diethylphosphono-1-methylethyl nitroxide di-t-butyl nitroxide diphenyl nitroxide t-butyl t-amyl nitroxide.

A range of further polymerization methods in accordance with which the polyacrylate PSAs for layers A and/or C may alternatively be prepared can be chosen from the prior art: U.S. Pat. No. 4,581,429 A discloses a controlled-growth radical polymerization process which uses as its initiator a compound of the formula R'R"N—O—Y, in which Y denotes a free radical species which is able to polymerize unsaturated monomers. In general, however, the reactions have low conversion rates. A particular problem is the polymerization of acrylates, which takes place only with very low yields and molar masses. WO 98/13392 A1 describes open-chain alkoxyamine compounds which have a symmetrical substitution pattern. EP 735 052 A1 discloses a process for preparing thermoplastic elastomers having narrow molar mass distributions. WO 96/24620 A1 describes a polymerization process in which very specific radical compounds, such as phosphorus-containing nitroxides based on imidazolidine, are used. WO 98/44008 A1 discloses specific nitroxyles based on morpholines, piperazinones and piperazinediones. DE 199 49 352 A1 describes heterocyclic alkoxyamines as regulators in controlled-growth radical polymerizations. Corresponding further developments of the alkoxyamines or of the corresponding free nitroxides improve the efficiency for the preparation of polyacrylates (Hawker, contribution to the National Meeting of The American Chemical Society, Spring 1997; Husemann, contribution to the IUPAC World Polymer Meeting 1998, Gold Coast).

As a further controlled polymerization method atom transfer radical polymerization (ATRP) can be used advantageously to synthesize the polyacrylate PSAs, in which case use is made preferably as initiator of monofunctional or difunctional secondary or tertiary halides and, for extracting the halide(s), of complexes of Cu, Ni, Fe, Pd, Pt, Ru, Os, Rh, Co, Ir, Ag or Au (EP 0 824 111 A1; EP 826 698 A1; EP 824 110 A1; EP 841 346 A1; EP 850 957 A1). The various possibilities of ATRP are further described in U.S. Pat. Nos. 5,945,491 A, 5,854,364 A and 5,789,487 A.

For advantageous further development, resins may be admixed to the acrylate-containing PSAs of layer C and/or, where appropriate, of layer A. Tackifying resins to be added include without exception all existing tackifier resins described in the literature. Representatives that may be mentioned include pinene resins, indene resins, and rosins, their disproportionated, hydrogenated, polymerized, esterified derivatives and salts, the aliphatic and aromatic hydrocarbon resins, terpene resins and terpene-phenolic resins, and also C5, C9, and other hydrocarbon resins. Any desired combinations of these and further resins may be used in order to adjust the properties of the resulting adhesive in accordance with what is desired. In general it is possible to use all resins which are compatible (soluble) with the corresponding polyacrylate; mention may be made in particular of all aliphatic, aromatic and alkylaromatic hydrocarbon resins, hydrocarbon resins based on pure monomers, hydrogenated hydrocarbon resins, functional hydrocarbon resins, and natural resins. Explicit reference is made to the depiction of the state of the art in the "Handbook of Pressure Sensitive Adhesive Technology" by Donatas Satas (van Nostrand, 1989).

It is also possible optionally to add plasticizers, fillers (e.g., fibers, carbon black, zinc oxide, titanium dioxide, chalk, soluble hollow glass beads, microbeads of other materials, silica, silicates), nucleators, blowing agents, compounding agents and/or aging inhibitors, in the form of primary and secondary antioxidants, for example, or in the form of light stabilizers.

Preferably, the internal strength (cohesion) of the PSA is raised by crosslinking. For this purpose, compatible crosslinker substances may optionally be added to the acrylate-containing PSAs. Examples of suitable crosslinkers include metal chelates, polyfunctional isocyanates, polyfunctional amines or polyfunctional alcohols. Polyfunctional acrylates may also be used with advantage as crosslinkers for an actinic irradiation.

The acrylate-containing PSAs may be applied from solution to the carrier material (layer B) or from the melt. For application from the melt the solvent is preferably taken off under reduced pressure in a concentrating extruder, for which purpose it is possible, for example, to use single-screw or twin-screw extruders which preferably distil off the solvent in different vacuum stages or in identical vacuum stages and which possess a feed preheater.

Following coating, the acrylate-containing PSAs are preferably crosslinked on the carrier. For optional crosslinking with UV light, UV-absorbing photoinitiators are added to the acrylate-containing PSAs. Useful photoinitiators which are very effective in use are benzoin ethers, such as benzoin methyl ether and benzoin isopropyl ether, substituted acetophenones, such as 2,2-diethoxyacetophenone (available as Irgacure 651® from Ciba Geigy®), 2,2-dimethoxy-2-phenyl-1-phenylethanone, dimethoxyhydroxyacetophenone, substituted α-ketols, such as 2-methoxy-2-hydroxypropiophenone, aromatic sulfonyl chlorides, such as 2-naphthylsulfonyl chloride, and photoactive oximes, such as 1-phenyl-1,2-propanedione 2-(O-ethoxycarbonyl)oxime.

The abovementioned photoinitiators and others which can be used and others of the Norrish I or Norrish II type may contain the following radicals: benzophenone, acetophenone, benzil, benzoin, hydroxyalkylphenone, phenyl cyclohexyl ketone, anthraquinone, trimethylbenzoylphosphine oxide, methylthiophenyl morpholine ketone, aminoketone, azobenzoin, thioxanthone, hexaarylbisimidazole, triazine, or fluorenone radicals, it being possible for each of these radicals to be additionally substituted by one or more halogen atoms and/or one or more alkyloxy groups and/or one or more amino groups or hydroxyl groups. A representative overview is given by Fouassier in: "Photoinitiation, Photopolymerization and Photocuring: Fundamentals and Applications", Hanser-Verlag, Munich 1995. It is also possible to consult Carroy et al. in "Chemistry and Technology of UV and EB Formulation for Coatings, Inks and Paints", Oldring (ed.), 1994, SITA, London.

In principle, it is also possible to crosslink the acrylate-containing PSAs with electron beams. Typical irradiation equipment which may be used includes linear cathode systems, scanner systems, or segmented cathode systems, where electron beam accelerators are concerned. An extensive description of the state of the art and of the most important process parameters can be found in Skelhorne, Electron Beam Processing, in Chemistry and Technology of UV and EB formulation for Coatings, Inks and Paints, Vol. 1, 1991, SITA, London. The typical accelerating voltages are in the range between 50 kV and 500 kV, preferably 80 kV and 300 kV. The scatter doses employed are between 5 and 150 kGy, in particular between 20 and 100 kGy.

Figure 1:
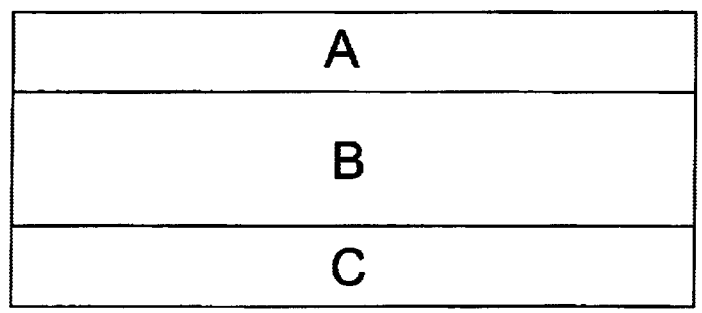
FIG. 1 illustrates the adhesive tape of the invention, having layers A, B and C.

A self-adhesive tape in accordance with the above description, in FIG. 1, consisting essentially of a laminate of a crosslinked polyurethane composition, a pressure sensitive adhesive layer and a hotmelt adhesive layer, and characterized by a three-layer adhesive layer/crosslinked polyurethane layer/hotmelt adhesive layer structure, is unknown in the prior art.

The adhesive tapes of the invention can be used with preference for the adhesive bonding of different substrates (adhesive fixing tapes). Where poly-α-olefins are used as heat activatable adhesives for layer A, rubber articles, for example, are preferably bonded with this layer. One specific application might be, for example, the bonding of rubber profiles, in which first of all the poly-α-olefin is softened at high temperatures and then the entire adhesive tape is laminated onto the rubber profile. The whole rubber profile can then be fastened to different substrates by layer C, the adhesive tape of the invention building up a very stable bond on account of the fact that the respective adhesives are chemically attached to the carrier material.

In this form, virtually all rubber articles can be fastened to different substrates, it being possible on the one hand, through the softening temperature of the layer A, to control the activation and, on the other hand, through the composition of the layer C, to generate different bond strengths and adapt them to the substrate in question.

Moreover, this adhesive tape is likewise suitable for adhesive bonds which are exposed to moisture over a long period. Where poly-α-olefins are used for layer A, these polymers possess very hydrophobic properties and repel water very consistently. Accordingly, the adhesive tapes of the invention also have sealing properties and may therefore fulfil a dual function: sealing on one side (layer A) and bonding with the other side (layer C).

The carrier (layer B) may likewise take on different functions as a result of the great variability. On the one hand, a soft carrier material may take on a damping function, so that in the case of fixing bonds the adhesive tape of the invention also has a damping function, as in the case of insulations, for example. The damping function may relate to sound waves, may arrest heat or may minimize vibrations or compensate for them completely. Moreover, the layer B may improve the aforementioned properties; for example, it may through an appropriate choice increase the moisture resistance (acting as a release layer) or, by virtue of an elastic component, may increase the bond strength of the layer C, so that bonds can be performed which require high holding forces.

EXAMPLES

Heat Activatable Polymers (Layer A)

The heat activatable adhesive was prepared using the commercial polyethylene/butylene copolymer Vestoplast® 408 and the polyethene/propene copolymer Vestoplast® 708. The copolymers were each applied from the melt through a coating nozzle at 50 g/m² to a release paper coated with 2.5 g/m² silicone.

The Vestoplast® copolymers used are characterized by the manufacturer as follows:

| Mechanical, thermal, calorific properties | Measurement method | Unit | 408 butene-rich | 708 propene-rich |
|---|---|---|---|---|
| Melt viscosity at 190° C. | based on DIN 53 019 | mPa · s | 8 000 ± 2 000 | 8 000 ± 2 000 |
| Softening point (ring & ball) | based on DIN 52 011 | ° C. | 118 ± 4 | 106 ± 4 |
| Needle penetration (100/25/5) | based on DIN 52 010 | 0.1 mm | 5 ± 2 | 19 ± 3 |
| Heat stability | Degussa method based on WPS 68 (5° C./h, weight 450 g) | ° C. | 85–90 | 85–90 |

-continued

| Mechanical, thermal, calorific properties | Measurement method | Unit | 408 butene-rich | 708 propene-rich |
|---|---|---|---|---|
| Tensile strength | based on DIN 53 455 rod 4 | N/mm² | 6.8 | 1.0 |
| Elongation at break | | % | 80 | 330 |
| Shear modulus at 23° C. | DIN 53 455 | N/mm² | 70 | 4 |
| Molar mass $M_n$ | GPC based on DIN 55 672 | g/mol | 11 600 | 11 500 |
| Molar mass $M_w$ | GPC based on DIN 55 672 | | 48 000 | 75 000 |
| Open time | Degussa method QS-AA-MAT 3-05 | s or min | 65 s | 55 s |
| Setting time | Degussa method QS-AA-MAT 3-29 | s | 1 | 1 |
| Glass transition temperature $T_g$ | DSC analysis based on DIN 53 765 Degussa method AN-SAA-0663 | ° C. | −27 | −33 |
| Density at 23° C. | DIN 53 479 | g/cm³ | 0.9 | 0.87 |
| Shore A hardness | DIN 53 505 | — | 94 | 67 |

Preparation of Polyacrylates (Layer C)

Polyacrylate 1:

A 2 L glass reactor conventional for radical polymerizations was charged with 40 g of acrylic acid, 360 g of 2-ethylhexyl acrylate and 133 g of acetone/isopropanol (96:4). Nitrogen gas was passed through the mixture for 45 minutes with stirring and then the reactor was heated to 58° C. and 0.2 g of azoisobutyronitrile (AIBN, Vazo 64®, DuPont) was added. The external heating bath was then heated to 75° C. and the reaction was carried out constantly at this external temperature. After a reaction time of 1 hour a further 0.2 g of AIBN was added. After 4 hours and 8 hours, in each case 100 g of acetone/isopropanol (96:4) mixture were added for dilution. To reduce the residual initiators, after 8 hours and 10 hours in each case 0.6 g of bis(4-tert-butylcyclohexanyl) peroxydicarbonate (Perkadox 16®, Akzo Nobel) was added. After 24 hours the reaction was terminated and the product cooled to room temperature. The polyacrylate was subsequently blended with 0.4% by weight of aluminum(III) acetylacetonate (3% strength solution in isopropanol), diluted with isopropanol to a solids content of 30%, and then applied from solution to a siliconized release paper from Laufenberg with a silicone coating of 1.2 g/m². After drying at 120° C. for 10 minutes the application rate was 50 g/m².

Polyacrylate 2:

A 2 L glass reactor conventional for radical polymerizations was charged with 28 g of acrylic acid, 80 g of methyl acrylate, 292 g of 2-ethylhexyl acrylate and 200 g of acetone/isopropanol (95:5). Nitrogen gas was passed through the mixture for 45 minutes with stirring and then the reactor was heated to 58° C. and 0.2 g of azoisobutyronitrile (AIBN, Vazo 64®, DuPont) was added. The external heating bath was then heated to 75° C. and the reaction was carried out constantly at this external temperature. After a reaction time of 1 hour a further 0.2 g of AIBN was added. After 4 hours and 8 hours, in each case 100 g of acetone/isopropanol (95:5) mixture were added for dilution. To reduce the residual initiators, after 8 hours and 10 hours in each case 0.6 g of bis(4-tert-butylcyclohexanyl)peroxydicarbonate (Perkadox 16®, Akzo Nobel) was added. After 24 hours the reaction was terminated and the product cooled to room temperature. The polyacrylate was subsequently blended with 0.4% by weight of aluminum(III) acetylacetonate (3% strength solution in isopropanol), diluted with isopropanol to a solids content of 30%, and then applied from solution to a siliconized release paper from Laufenberg with a silicone coating of 1.2 g/m². After drying at 120° C. for 10 minutes the application rate was 50 g/m².

Production of the PU Carriers (Layer B)

For the examples indicated, coating is carried out on a laboratory coating unit from Pagendarm. The web width was 50 cm. The width of the coating gap was variable between 0 and 1 cm. The length of the heating tunnel was about 12 m. The temperature in the heating tunnel was divisible into four zones, each freely selectable between room temperature and 120° C.

A multicomponent mixing and metering unit from Spritztechnik-EMC was used. The mixing system was dynamic. The mixing head was designed for two liquid and one gaseous components. The mixing rotor had a variable speed of up to approximately 5 000 rpm. The metering pumps of this unit were gear pumps having a maximum capacity of about 2 L/min.

The components for layer B (polyols and any adjuvants) were premixed in an evacuatable mixing vessel from Molteni.

Table 1 lists the materials used for producing the carrier, in each case with trade name and manufacturer. The chemicals referred to are all freely available commercially.

The starting materials are used in different proportions in each case according to the intended use of the self-adhesive tape.

TABLE 1

Materials used for producing the polyurethane carrier, with trade name and manufacturer

| Trade name | Chemical basis | Manufacturer/Supplier |
|---|---|---|
| Arcol 1010 ® | Polyetherdiol | ARCO |
| Arcol 1042 ® | Polyethertriol | ARCO |
| Baycoll BT 5035 ® | Polyethertriol | Bayer |
| Poly bd R45HT ® | Hydroxyl-terminated polybutadiene | Elf Atochem |
| Lutensol AO7 ® | Ethoxylated $C_{13}C_{15}$ oxo alcohol | BASF |
| 1-Dodecanol ® | 1-Dodecanol | Aldrich |
| Omyacarb 4 BG ® | Chalk | OMYA |
| Barytmehl N ® | Barium sulfate | Alberti |
| Talkum Prever ® | Talc | Luzenac |
| Zinkoxid Harzsiegel GR ® | Zinc oxide | Heubach |
| Dualite M 6001 AE ® | Coated polymer beads | OMYA |
| Reflexperlen 50μ ® | Solid glass beads | Lindner |
| Sphericel 110 P8 ® | Hollow glass beads | Potters-Ballotini |
| Weißfeinkalk ® | Calcium oxide | RWK |
| Aerosil R202 ® | Hydrophobicized pyrogenic silica | Degussa |
| Printex 30 ® | Carbon black | Degussa |
| Desmodur CD ® | Modified diphenylmethane 4,4'-diisocyanate | Bayer |
| Vestanat IPDI ® | Isophorone diisocyanate | Hüls |

Below, 11 formulations are given, in each case in the form of a table, for the production of carriers according to the invention. The materials used are each processed by the method described afterward.

Example 1

| | |
|---|---|
| Baycoll BT 5035 | 40.0 kg |
| Lutensol AO7 | 3.2 kg |
| Omyacarb 4BG | 47.0 kg |
| Weißfeinkalk | 3.0 kg |
| Aerosil R202 | 2.0 kg |
| Desmodur CD | 4.7 kg |
| DBTL | 0.1 kg |

Example 2

| | |
|---|---|
| Baycoll BT 5035 | 40.0 kg |
| 1-Dodecanol | 1.2 kg |
| Omyacarb 4BG | 49.0 kg |
| Weißfeinkalk | 3.0 kg |
| Aerosil R202 | 2.0 kg |
| Desmodur CD | 4.7 kg |
| DBTL | 0.1 kg |

Example 3

| | |
|---|---|
| Arcol 1042 | 42.0 kg |
| Lutensol AO7 | 1.5 kg |
| Omyacarb 4BG | 48.8 kg |
| Weißfeinkalk | 3.0 kg |
| Printex 30 | 1.0 kg |
| Vestanat IPDI | 3.4 kg |
| DBTL | 0.3 kg |

Example 4

| | |
|---|---|
| Arcol 1042 | 42.0 kg |
| Omyacarb 4BG | 51.3 kg |
| Weißfeinkalk | 3.0 kg |
| Printex 30 | 1.0 kg |
| Vestanat IPDI | 2.4 kg |
| DBTL | 0.3 kg |

Example 5

| | |
|---|---|
| Poly bd R 45 HT | 17.2 kg |
| Arcol 1010 | 17.6 kg |
| Lutensol AO 7 | 3.1 kg |
| Omyacarb 4BG | 49.8 kg |
| Weißfeinkalk | 3.0 kg |
| Printex 30 | 1.0 kg |
| Desmodur CD | 8.2 kg |
| DBTL | 0.1 kg |

Example 6

| | |
|---|---|
| Poly bd R 45 HT | 17.2 kg |
| Arcol 1010 | 17.6 kg |
| Lutensol AO 7 | 3.1 kg |
| Omyacarb 4BG | 19.8 kg |
| Barytmehl N | 30.0 kg |
| Weißfeinkalk | 3.0 kg |
| Printex 30 | 1.0 kg |
| Desmodur CD | 8.2 kg |
| DBTL | 0.1 kg |

Example 7

| | |
|---|---|
| Poly bd R 45 HT | 17.2 kg |
| Arcol 1010 | 17.6 kg |
| Lutensol AO 7 | 3.1 kg |
| Omyacarb 4BG | 34.8 kg |
| Talkum Prever | 15.0 kg |
| Weißfeinkalk | 3.0 kg |
| Printex 30 | 1.0 kg |
| Desmodur CD | 8.2 kg |
| DBTL | 0.1 kg |

Example 8

| | |
|---|---|
| Poly bd R 45 HT | 17.2 kg |
| Arcol 1010 | 17.6 kg |
| Lutensol AO 7 | 3.1 kg |
| Omyacarb 4BG | 39.8 kg |
| Zinkoxid Harzs. GR | 10.0 kg |
| Weißfeinkalk | 3.0 kg |
| Printex 30 | 1.0 kg |
| Desmodur CD | 8.2 kg |
| DBTL | 0.1 kg |

Example 9

| | |
|---|---|
| Poly bd R 45 HT | 17.2 kg |
| Arcol 1010 | 17.6 kg |
| Lutensol AO 7 | 3.1 kg |
| Omyacarb 4BG | 39.8 kg |
| Dualite M6001 AE | 10.0 kg |
| Weißfeinkalk | 3.0 kg |
| Printex 30 | 1.0 kg |
| Desmodur CD | 8.2 kg |
| DBTL | 0.1 kg |

Example 10

| | |
|---|---|
| Poly bd R 45 HT | 17.2 kg |
| Arcol 1010 | 17.6 kg |
| Lutensol AO 7 | 3.1 kg |
| Omyacarb 4BG | 39.8 kg |
| Reflexperlen 50µ | 10.0 kg |
| Weißfeinkalk | 3.0 kg |
| Printex 30 | 1.0 kg |
| Desmodur CD | 8.2 kg |
| DBTL | 0.1 kg |

Example 11

| | |
|---|---|
| Poly bd R 45 HT | 17.2 kg |
| Arcol 1010 | 17.6 kg |
| Lutensol AO 7 | 3.1 kg |
| Omyacarb 4BG | 39.8 kg |
| Sphericel 110 P8 | 10.0 kg |
| Weißfeinkalk | 3.0 kg |
| Printex 30 | 1.0 kg |
| Desmodur CD | 8.2 kg |
| DBTL | 0.1 kg |

General Production Process for the Double Sided Adhesive Tapes

The pastes (examples 1 to 11), following the addition of the isocyanate, are spread out to a web 1 mm thick in a commercial coating unit on commercial, double sidedly siliconized paper, and in a subsequent pass through the drying tunnel at a temperature from room temperature to 120° C. are crosslinked to an elastomer with a residence time of from 10 to 30 minutes. After curing and subsequent storage at room temperature for one week the carriers have a Shore A hardness of from 10 to 60, a glass transition temperature in the range from −60° C. to −30° C., and a tensile strength of more than 1 N/mm$^2$ with an elongation at break of less than 500%.

Thereafter the material is coated on both sides in two steps, with layer A being applied to one side and layer C to the other side. Layer A (Vestoplast 408® or 708®) is first applied at 50 g/m$^2$ to a siliconized release paper (2.5 g/m$^2$ Si application rate).

Layer C is supplied at 50 g/m$^2$ as crosslinked polyacrylate 1 or 2 likewise on a commercial siliconized release paper.

Coating with the adhesives takes place following an inline corona treatment, with layers A and C being laminated directly from the respective release paper onto the carrier (layer B). The system is dried and crosslinked at 100° C. The double sided adhesive tape obtained in this way is lined on one side with release paper.

In one particularly preferred production process, the polyacrylate PSA (layer C) is first coated onto release paper or release film and dried and crosslinked at 120° C. Coating with the polyurethane mixture takes place directly onto the applied polyacrylate composition. For the preferred process, coating takes place using a coating bar, where appropriate with regulated metering of nitrogen and also, in a separate experiment, without metering of gas. In the case of gas metering, a foam density of 600 and 1 000 kg/m$^3$ was set. The coating speed was 2 m m/min. Still before curing and crosslinking of the polyurethane composition, layer A, which is likewise already applied, dried and crosslinked on release paper or release film, is laminated with the polyurethane composition. For this step it may be of advantage if layer C on release paper is heated beforehand and corona treated. Subsequently, curing and crossing of the polyurethane composition (layer B) take place in a pass through the drying tunnel at a temperature between room temperature and 120° C., depending on the chosen polyurethane formulation and on the amount of catalyst.

The double sided adhesive tape features high structural strength and the bonds produced using it possess outstanding damping properties as a result of the appropriate choice of the carrier layer B. Moreover, the adhesive tapes of the invention possess excellent low temperature impact strength and provide very effective sealing with respect to moisture.

The structure of the adhesive tapes produced is shown in the following table:

| Product structure | Layer A (25 g/m$^2$) | Layer B (400 µm) | Layer C (50 g/m$^2$) | Foamed (kg/m$^3$) |
|---|---|---|---|---|
| 1 | Vestoplast 408 ® | Example 1 | Polyacrylate 1 | — |
| 2 | Vestoplast 408 ® | Example 2 | Polyacrylate 1 | — |
| 3 | Vestoplast 408 ® | Example 3 | Polyacrylate 1 | — |
| 4 | Vestoplast 408 ® | Example 4 | Polyacrylate 1 | — |
| 5 | Vestoplast 408 ® | Example 5 | Polyacrylate 1 | 600 |
| 6 | Vestoplast 408 ® | Example 6 | Polyacrylate 1 | — |
| 7 | Vestoplast 708 ® | Example 7 | Polyacrylate 2 | — |
| 8 | Vestoplast 708 ® | Example 8 | Polyacrylate 2 | — |
| 9 | Vestoplast 708 ® | Example 9 | Polyacrylate 2 | — |

-continued

| Product structure | Layer A (25 g/m²) | Layer B (400 μm) | Layer C (50 g/m²) | Foamed (kg/m³) |
|---|---|---|---|---|
| 10 | Vestoplast 708 ® | Example 10 | Polyacrylate 2 | 1000 |
| 11 | Vestoplast 708 ® | Example 11 | Polyacrylate 2 | — |

We claim:

1. An adhesive tape comprising at least a three-layer product structure having the following layers A, B, and C with the layer sequence ABC:
   Layer A: heat activatable adhesive having a characteristic activation temperature $T_A$ of at least +30° C.,
   Layer B: crosslinked polyurethane carrier material,
   Layer C: pressure sensitive adhesive based on polyacrylates, polymethacrylates or both, having a static glass transition temperature $T_{G,C}$ of not more than +15° C.

2. The tape as claimed in claim 1, wherein at least one of the layers A and C is attached by chemical bonding to the polyurethane carrier layer B.

3. The tape as claimed in claim 2, wherein both the layers A and C are attached by chemical bonding to the polyurethane carrier layer B.

4. The tape as claimed in claim 1, wherein the heat activatable adhesive of layer A is based on poly-α-olefins or poly(meth)acrylates.

5. The tape as claimed in claim 1, wherein the polyurethane carrier layer B is based on a polymer of polyfunctional isocyanates and polyols.

6. The tape as claimed in at claim 1, wherein least one of the adhesives of layers A or C is a polyacrylate which is based on a monomer mixture containing at least 70% by weight of acrylates, methacrylates, their free acids, or a combination thereof, of the general formula $$CH_2=C(R_1)(COOR_2)$$

where $R_1$ is H or $CH_3$ and $R_2$ is H or alkyl chains having from 1 to 30 carbon atoms, with the proviso that the monomer compositions are chosen such that the respective conditions for the activation temperature $T_A$ and/or the glass transition temperature $T_{G,C}$ of the resulting adhesives are met.

7. The tape as claimed in claim 6, wherein for $R_2$ alkyl chains having from 4 to 14 carbon atoms are chosen.

8. A method of bonding two different substrates to one another, which comprises bonding said substrates with the adhesive tape of claim 1.

9. The method of claim 8, wherein the first of said two substrates is a rubber article, the second of said two substrates is a substrate to which polyacrylates adhere, and the heat activatable layer serves to bond the rubber article.

* * * * *

UNITED STATES PATENT AND TRADEMARK OFFICE
CERTIFICATE OF CORRECTION

PATENT NO. : 6,958,186 B2
APPLICATION NO. : 10/197767
DATED : October 25, 2005
INVENTOR(S) : Husemann et al.

It is certified that error appears in the above-identified patent and that said Letters Patent is hereby corrected as shown below:

Column 6, Line 8, "$know_n$," should read -- known --

Column 9, Line 11, "being conclusive" should read -- being conclusive. --

Column 22, Line 4, "claimed in at claim 1, wherein least one" should read -- claimed in claim 1, wherein at least one --

Signed and Sealed this

Twenty-fifth Day of March, 2008

JON W. DUDAS
*Director of the United States Patent and Trademark Office*